United States Patent Office 3,359,265
Patented Dec. 19, 1967

3,359,265
PHENOTHIAZINE DERIVATIVES
Ernst Jucker, Ettingen, Anton Ebnöther, Reinach, Basel-Land, Adolf Lindenmann, Erwin Rissi, and Erhard Schenker, Basel, and Rudolf Süess, Bettingen, Switzerland, assignors to Sandoz Ltd., Basel, Switzerland
No Drawing. Filed June 22, 1966, Ser. No. 559,395
Claims priority, application Switzerland, July 17, 1964, 9,384/64; Apr. 5, 1965, 4,698/65; July 13, 1965, 9,814/65
19 Claims. (Cl. 260—243)

ABSTRACT OF THE DISCLOSURE

Several methods are described for the preparation of phenothiazines substituted in the 10-position with a three-carbon atom chain linked to a diazaspiro[4,5]decan-1,3-dione group of the formula

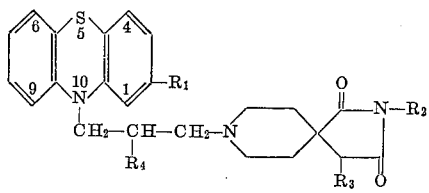

The new compounds have sedative and neuroleptic properties, that is, a narcosis potentiating effect, and also adrenolytic properties, as well as hypotensive or antihypertensive and bradycardiac effects.

---

The present application is a continuation-in-part application of our copending application Ser. No. 470,236, now abandoned.

The present invention relates to new phenothiazine derivatives, processes for their production, acid addition salts thereof and pharmaceutical compositions containing the same.

The present invention provides phenothiazine derivatives of Formula I,

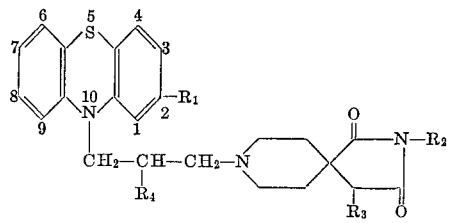

in which $R_1$ signifies a hydrogen or halogen atom, a lower alkoxy, lower alkylthio, lower acyl, the trifluoromethyl, cyano, N,N - dimethylsulphamoyl N,N - dimethylcarbamoyl, methylsulphinyl or the methylsulphonyl radical,
$R_2$ signifies a lower alkyl or aralkyl radical ($C_7$–$C_{10}$),
$R_3$ signifies a hydrogen atom or a lower alkyl radical and
$R_4$ signifies a hydrogen atom or the methyl radical, and their acid addition salts. As used herein the term "lower" indicates alkyl, alkoxy and alkylthio radicals with from 1 to 4 carbon atoms inclusive each, acyl radicals of 2 to 4 carbon atoms inclusive and aralkyl radicals with from 7 to 10 carbon atoms inclusive.

The present invention further provides the following three processes for the production of compounds of Formula I and their acid addition salts:

(1) A 10-(3-halogenopropyl)-phenothiazine derivative of Formula II,

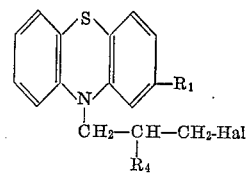

in which $R_1$ and $R_4$ have the above significance and Hal signifies a chlorine, bromine or iodine atom, is heated with a diazaspiro[4,5]decan-1,3-dione of Formula III,

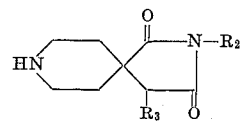

in which $R_2$ and $R_3$ have the above significance, in the presence of an acid binding agent, and—when an acid addition salt is required—reaction with an organic or inorganic acid is effected.

(2) A phenothiazine-10-carboxylic acid ester of Formula VI,

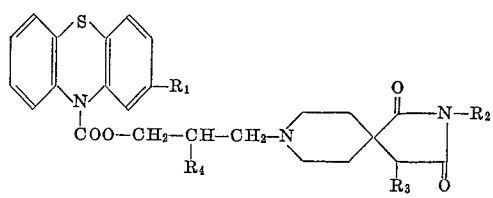

in which $R_1$ to $R_4$ have the above significance, is decarboxylated by heating, and—when an acid addition salt is required—reaction with an organic or inorganic acid is effected. The compounds of Formula VI may be produced by condensing a phenothiazine-10-carboxylic acid chloride of Formula IV,

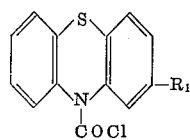

in which $R_1$ has the above significance, with a diazaspiro [4,5]decan-1,3-dione of Formula V,

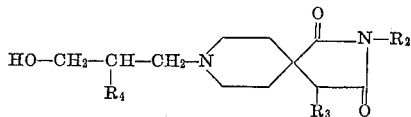

in which $R_2$, $R_3$ and $R_4$ have the above significance.

(3) A phenothiazine derivative of Formula VII,

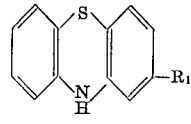

in which $R_1$ has the above significance, is reacted with a diazaspiro[4,5]decan-dione of Formula VIII,

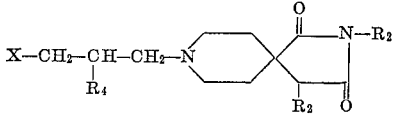

in which $R_2$, $R_3$ and $R_4$ have the above significance, and X signifies a reactive acid radical in the presence of an alkaline condensation agent, and—when an acid addition salt is required—reaction with an organic or inorganic acid is effected.

Specific methods of effecting each of the above three processes are as follows:

(1) A phenothiazine derivative of Formula II, e.g. 2-chloro-10-(3-chloropropyl)-phenothiazine or 2-chloro-10-(2-methyl-3-chloropropyl)-phenothiazine, is heated to 130–180° C. in a bomb-tube for a period of about 2 to about 4 days together with a diazaspiro[4,5]decan-1,3-dione of Formula III, e.g. 2-methyl-, 2-ethyl- or 2-benzyl-2,8-diazaspiro[4,5]decan-1,3-dione or 2,4-dimethyl-2,8-diazaspiro[4,5]decan-1,3-dione, in an anhydrous organic solvent, preferably toluene or xylene. A tertiary organic base or an excess of compound III may, for example, be used as acid binding agent.

(2) A phenothiazine-10-carboxylic acid chloride of Formula IV is heated to the boil for approximately one day together with a diadaspiro[4,5]decan-1,3-dione of Formula V, e.g. 8-(3-hydroxypropyl)-2-methyl - 2,8 - diazaspiro[4,5]decan-1,3-dione, in absolute toluene or absolute xylene. A tertiary organic base or an excess of compound V may, for example be used as acid binding agent. The phenothiazine-10-carboxylic acid ester of Formula VI isolated from the reaction mixture is subsequently decarboxylated by heating (about 200° C.) at a strongly reduced pressure in manner known per se, if necessary in the presence of copper powder, to give the required product of Formula I.

(3) A phenothiazine derivative of Formula VII in absolute toluene or absolute xylene is heated to the boil in the presence of an alkaline condensation agent, e.g. sodium or potassium amide, butyl lithium, powdered sodium or potassium, and a diazaspiro[4,5]decan-1,3-dione of Formula VIII, in which X preferably signifies a chlorine, bromine or iodine atom or O-tosyl, dissolved in more of the same solvent, is added to the reaction mixture which has been cooled to 40° C. The mixture is then heated to the boil for several hours to complete the reaction.

The compounds of Formula I resulting from any one of the three above methods may be isolated from the reaction mixture in manner known per se and purified by adsorption chromatography, crystallization or by conversion into an acid addition salt.

The compounds of Formula I are basic compounds; with organic or inorganic acids they form relatively stable salts which are crystalline at room temperature; examples of acids for acid addition salt formation are: hydrochloric, hydrobromic, sulphuric, malonic, succinic, fumaric, maleic, tartaric, malic, hexahydrobenzoic, methanesulphonic, p-toluene-sulphonic acid and naphthalene-1,5-disulphonic acid.

The compounds of Formula I have sedative and neuroleptic properties, e.g. a narcosis potentiating effect, an inhibition of the conditioned end emotional reactions and of motor activity. The compounds of Formula I furthermore have marked adrenolytic properties as well as hypotensive or antihypertensive and bradycardiac effects. Especially useful in this respect are 2-methylsulphonyl-2-(N,N-dimethylsulphamoyl)- and 2-chloro-10-[3-(2-methyl-1,3-dioxo-2,8-diazaspiro[4,5]decan-8-yl) - propyl] - phenothiazine.

The latter compound, in comparison with known commercial preparations having analogous effects, is distinguished by an approximately equal neuroleptic effect whilst its toxicity is considerably lower and by weaker cataleptic and stronger adrenolytic properties. Furthermore, in experiments effected with animals, it has a stronger effect on a condition of excitation produced artificially, e.g. by the administration of amphetamine, than on the spontaneous (normal) motor activity. The exemplified compounds of Formula I have especially pronounced pharmacologically useful properties.

The compounds of Formula I and their acid addition salts are indicated for use in psychiatry as sedatives and/or neuroleptics. Since it is often desirable to administer pharmaceuticals in water soluble form, the water soluble acid addition salts of the compounds of Formula I are particularly desirable.

A suitable daily dosage of the compounds I, especially of the compound 2-chloro-10-[3-(2-methyl-1,3-dioxo-2,8-diazaspiro[4,5]decan-8-yl)-propyl]-phenothiazine, is from 15 to 150 mg. This may suitably be administered in dosages of 3 times 5 mg. to 6 times 25 mg. per day.

The compounds of Formula I are suggested for use as pharmaceuticals on their own or in the form of appropriate medicinal preparations for administration, e.g. enterally or parenterally. In order to produce suitable medicinal preparations the compounds are worked up with organic or inorganic adjuvants which are inert and physiologically acceptable.

Examples of such adjuvants are:

Tablets and dragées: lactose, starch, talc and stearic acid;
Injectable solutions: water, alcohols, glycerin and vegetable oils;

The preparations may furthermore contain suitable preserving, stabilizing and wetting agents, solubilizers, sweetening and colouring substances and flavourings.

Especially convenient have been found to be tablets containing 5, 15 and 25 mg. of active material and ampoules containing 5 and 20 mg. of active material.

The present invention thus further provides pharmaceutical compositions containing, in addition to an inert, physiologically acceptable carrier, a compound of Formula I and/or an acid addition salt thereof.

The compounds of Formula V, VI and VIII and their acid addition salts are new and included in the present invention; the compounds of Formula V and VIII may be obtained from 2,8-diazaspiro[4,5]decan 1,3-diones of Formula III as follows:

(a) A compound of Formula III is reacted with a halogen alkanol of Formula IX,

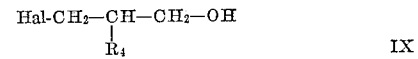

in which $R_4$ has the above significance, and Hal signifies a chlorine, bromine or iodine atom, in an inert organic solvent, preferably benzene, in the presence of an acid binding agent at room temperature or higher. A tertiary organic base or an excess of the compound III may, for example, be used as acid binding agent.

The resulting compound of Formula V may be isolated and purified in manner known per se.

(b) The compounds of Formula VIII may be produced by replacing the hydroxyl radical of the corresponding compound of Formula V with a reactive acid radical in manner known per se, e.g. by treatment with a thionyl halide or a p-toluenesulphonyl halide.

The acid addition salts of the compounds of Formula V, VI, and VIII may be produced in manner known per se; examples of suitable acids for this purpose are those mentioned above in connection with compounds of Formula I.

Some of the starting materials of Formulae II and IV are also new and may easily be produced from the phenothiazine derivatives of Formula VII, as follows:

Reaction with phosgene yields the carboxylic acid chlorides of Formula IV;
Treating with a suitable 1,3-dihalogen-propane in the presence of a strong base, e.g. sodium amide in liquid ammonia, yields 10-(3-halogenpropyl)-phenothiazines of Formula II.

The term "in manner known per se" as utilized herein designates methods in use or described in the laterature on the subject.

In the following non-limitative examples all temperatures are indicated in degrees centigrade and are uncorrected.

EXAMPLE 1

*2-chloro-10-[3-(2-methyl-1,3-dioxo-2,8-diazaspiro-[4,5]decan-8-yl)-propyl]-phenthiazine*

A mixture of 27 g. of 2-chloro-10-(3-chloropropyl)-phenthiazine and 31.6 g. of 2-methyl-2,8-diazaspiro[4,5]decan-1,3-dione (melting point 67°) in 200 cc: of absolute xylene is heated to the boil whilst stirring for 72 hours. 200 cc. of water are subsequently added to the reaction mixture which has been cooled to room temperature, the organic phase is separated and extracted three times with a total of 350 cc. of a 15% aqueous tartaric acid solution. The acid extracts are then made alkaline with solid potassium carbonate and the liberated bases are extracted with chloroform. The chloroform extracts are washed with water, dried over sodium sulphate and evaporated at 15 mm. of Hg. The resulting viscous oil is dissolved in 270 cc. of boiling ethanol together with the calculated amount of fumaric acid for conversion into the acid fumarate. 2-chloro - 10 - [3 - (2 - methyl - 1,3 - dioxo - 2,8 - diazaspiro-[4,5]decan-8-yl)-propyl]-phenthiazine hydrogen fumarate, having a melting point of 203–205° (slight decomposition), crystallizes on cooling.

*Hydrochloride.*—Melting point 254–256° (decomposition) from ethanol.

EXAMPLE 2

*2-methoxy-10-[3-(2-methyl-1,3-dioxo-2,8-diazaspiro [4,5]decan-8-yl)-propyl]-phenthiazine*

The desired compound is obtained from 28 g. of 2-methoxy-10-(3-chloropropyl)-phenthiazine and 33.5 g. of 2-methyl-2,8-diazaspiro[4,5]decan-1,3-dione in 200 cc. of absolute xylene in a manner analogous to that described in Example 1.

*Hydrogen fumarate.*—Melting point 189–193° (decomposition) from ethanol.

EXAMPLE 3

*2-methylthio-10-[3-(2-methyl-1,3-dioxo-2,8-diazaspiro [4,5]decan-8-yl)-propyl]-phenthiazine*

The desired compound is obtained from 2-methylthio-10-(3-chloropropyl) - phenthiazine and 2-methyl-2,8-diazaspiro[4,5]decan-1,3-dione in absolute xylene in a manner analogous to that described in Example 1.

*Hydrogen fumarate.*—Melting point 178–180° (decomposition) from ethanol.

EXAMPLE 4

*2-trifluoromethyl-10-[3-(2-methyl-1,3-dioxo-2,8-diazaspiro[4,5]decan-8-yl)-propyl]-phenthiazine*

A mixture of 7.25 g. of 2-trifluoromethyl-10-(3-chloropropyl)-phenthiazine and 8.54 g. of 2-methyl-2,8-diazaspiro[4,5]decan-1,3-dione in 40 cc. of xylene is heated to 170° in a bomb tube for 48 hours. The contents of the tube are filtered off from the resulting precipitate and the filtrate is washed with water until neutral. The solution is dried over animal charcoal and the solvent is evaporated at 60–70° and a pressure of 15 mm. of Hg. The viscous residue is dissolved in a five-fold quantity of acetone and the calculated amount of methanesulphonic acid is added to the solution. The solution is reduced in volume to a small extent and allowed to crystallize. The crude methanesulphonate is purified by recrystallizing twice from ethanol. Pure 2-trifluoromethyl-10-[3,-(2-methyl-2,8-diazaspiro[4,5]decan-8-yl)-propyl] - phenthiazine methanesulphonate melts at 215–219° (decomposition).

EXAMPLE 5

*2-acetyl-10-[3-(2-methyl-1,3-dioxo-2,8-diazaspiro [4,5]decan-8-yl)-propyl]-phenthiazine*

The desired compound is obtained from 10.0 g. of 2-acetyl-10-(3-chloropropyl)-phenthiazine and 12.6 g. of 2-methyl-2,8-diazaspiro[4,5]decan-1,3-dione in a manner analogous to that described in Example 4 and is converted into the methanesulphonate. Melting point 227–230° (decomposition) from methanol.

EXAMPLE 6

*2-bromo-10-[3-(2-methyl-1,3-dioxo-2,8-diazaspiro [4,5]decan-8-yl)-propyl]-phenthiazine*

The desired compound is obtained from 6.7 g. of 2-bromo-10-(3-chloropropyl)-phenthiazine and 7.6 g. of 2-methyl-2,8-diazaspiro[4,5]decan-1,3-dione in a manner analogous to that described in Example 4 and is converted into the methanesulphonate. Melting point 250–252° (decomposition) from ethanol/water (3:1).

EXAMPLE 7

*2-chloro-10-[3-(2-ethyl-1,3-dioxo-2,8-diazaspiro [4,5]decan-8-yl)-propyl]-phenthiazine*

The desired compound is obtained from 9.3 g. of 2-chloro-10-(3-chloropropyl)-phenthiazine and 12.95 g. of 2-ethyl-2,8-diazaspiro[4,5]decan-1,3-dione in a manner analogous to that described in Example 4 and is converted into the methanesulphonate. Melting point 206–208° (decomposition).

EXAMPLE 8

*2-chloro-10-[3-(2-methyl-1,3-dioxo-2,8-diazaspiro [4,5]decan-8-yl)-2-methyl-propyl]-phenthiazine*

The desired compound is obtained from 9.90 g. of 2-chloro-10-(2-methyl-3-chloropropyl) - phenthiazine and 12.25 g. of 2-methyl-2,8-diazaspiro[4,5]decan-1,3-dione in a manner analogous to that described in Example 4. The resulting crude base is boiled in ether, whereupon crystallization occurs. Melting point 170–172° from benzene/acetone (1:9).

EXAMPLE 9

*2-chloro-10-[3-(2,4-dimethyl-1,3-dioxo-2,8-diazaspiro [4,5]decan-8-yl)-propyl]-phenthiazine*

A mixture of 13.3 g. of 2-chloro-10-(3-chloropropyl)-phenthiazine and 18.5 g. of 2,4-dimethyl-2,8-diazaspiro [4,5]decan-1,3-dione in 40 cc. of xylene is heated to 170° in a bomb tube for 48 hours. The contents of the tube are filtered off from the resulting precipitate and the filtrate is washed with water until neutral. The solution is dried over sodium sulphate, filtration is effected over animal charcoal and the solvent is evaporated at 60–70° and a pressure of 15 mm. of Hg. The resulting crude base is adsorbed on 600 g. of aluminium oxide. Elution is first effected with benzene and then with benzene/chloroform (1:1). The benzene/chloroform eluate is evaporated to dryness, the residue is dissolved in acetone and ethanolic hydrochloric acid is added to the solution until an acid reaction to Congo red indicator is obtained. After evaporating the solvent the semi-crystalline residue is boiled for a short time in 98% ethanol, whereupon crystallization occurs. By recrystallization of the crude hydrochloride from 95% ethanol the pure 2-chloro-10-[3-(2,4-dimethyl-1,3-dioxo-2,8 - diazaspiro[4,5]decan - 8-yl)-propyl]-phenthiazine hydrochloride, having a melting point of 258–259° (decomposition), is obtained.

EXAMPLE 10

*2-chloro-10-[3-(2-benzyl-1,3-dioxo-2,8-diazaspiro [4,5]decan-8-yl)-propyl]-phenthiazine*

A mixture of 6.2 g. of 2-chloro-10-(3-chloropropyl)-phenthiazine and 11.35 g. of 2-benzyl-2,8-dizaspiro[4,5] decan-1,3-dione in 40 cc. of xylene is heated to 170° in a bomb tube for 48 hours. The contents of the tube are filtered off from the resulting precipitate and the filtrate is washed with water until neutral. The solution is dried over sodium sulphate, filtration is effected over animal charcoal and the solvent is evaporated at 60–70° and a pressure of 15 mm. of Hg. The viscous residue is adsorbed on 300 g. of aluminium oxide. Elution is first effected with benzene and then with benzene/chloroform (1:1). The benzene/chloroform eluate is evaporated and the residue is recrystallized from acetone. Pure 2-chloro-10-[3-(2-benzyl - 1,3-dioxo-2,8 - diazaspiro[4,5]decan-8-yl)-propyl]-phenthiazine has a melting point of 147.5–148.5°.

EXAMPLE 11

*10-[3-(2-methyl-1,3-dioxo-2,8-diazaspiro[4,5]decan-8-yl)-propyl]-phenthiazine*

A mixture of 7.6 g. of 10-(3-chloropropyl)-phenthiazine and 11.05 g. of 2-methyl-2,8-diazaspiro[4,5]decan-1,3-dione in 40 cc. of xylene is heated to 170° in a bomb tube for 48 hours. The contents of the tube are filtered off from the resulting precipitate and the filtrate is taken up in 200 cc. of water. The product which is insoluble in water is filtered off and washed with water until neutral. After recrystallizing twice from benezene pure 10-[3-(2-methyl - 1,3 - dioxo - 2,8 - diazaspiro[4,5]decan - 8 - yl)- propyl]phenthiazine, having a melting point of 210–212°, is obtained.

EXAMPLE 12

*2-cyano-10-[3-(2-methyl-1,3-dioxo-2,8-diazaspiro[4,5]decan-8-yl)-propyl]-phenthiazine*

A mixture of 2.9 g. of 2-cyano-(3-chloropropyl)phenthiazine and 3.86 g. of 2-methyl-2,8-diazaspiro[4,5]decan-1,3-dione in 40 cc. of xylene is heated to 170° in a bomb tube for 48 hours. The contents of the tube are filtered off from the resulting precipitate and the filtrate is washed with water until neutral. The solution is dried over sodium sulphate and the solvent is evaporated at 50–70° and a pressure of 15 mm. of Hg. The viscous residue is dissolved in a five-fold quantity of acetone and the calculated amount of methanesulphonic acid is added to the solution. The mixture is allowed to crystallize in a refrigerator and pure 2-cyano-10-[3-(2-methyl-1,3-dioxo-2,8 - diazaspiro[4,5]decan - 8 - yl) - propyl] - phenthiazine methanesulphonate, having a melting point of 242–244° (slight decomposition), is obtained without further purification.

EXAMPLE 13

*2-chloro-10-[3-(2-methyl-1,3-dioxo-2,8-diazaspiro[4,5]decan-8-yl)-propyl]-phenthiazine.*

(a) *2 - chloro - phenthiazine - 10 - carboxylic acid [3-(2 - methyl - 1,3 - dioxo - 2,8 - diazaspiro[4,5]decan - 8-yl)-propyl]-ester.*—A mixture of 17.1 g. of 2-chloro-phenthiazine-10-carboxylic acid chloride and 29.1 g. of 8 - (3 - hydroxypropyl) - 2 - methyl - 2,8 - diazaspiro[4,5]decan-1,3-dione in 400 cc. of absolute toluene is heated to the boil whilst stirring for 24 hours. After filtration of the precipitated 8-(3-hydroxypropyl)-2-methyl-2,8-diazaspiro[4,5]decan-1,3-dione hydrochloride the filtrate is evaporated to dryness, the residue is dissolved in 500 cc. of ether and the ethereal solution is extracted three times with a total of 300 cc. of a 10% aqueous tartaric acid solution. A layer of 300 cc. of chloroform is placed under the acid extracts and solid potassium carbonate is added whilst cooling with ice until a strong alkaline reaction is obtained. The reaction mixture is subsequently extracted with chloroform, the extracts are dried over sodium sulphate and evaporated to dryness at 15 mm. of Hg.

*Hydrogen fumarate.*—The compound is dissolved whilst hot with the calculated amount of fumaric acid in ethanol. Pure 2 - chloro - phenthiazine - 10 - carboxylic acid [3-(2 - methyl - 1,3 - dioxo - 2,8 - diazaspiro[4,5]decan-8-yl)-propyl]-ester hydrogen fumarate, having a melting point of 182–184° (foaming at 150°), is obtained from the fumarate which crystallizes out after recrystallizing twice from ethanol.

(b) *2 - chloro - 10 - [3 - (2 - methyl - 1,3 - dioxo-2,8 - diazaspiro[4,5]decan - 8 - yl) - propyl] - phenthiazine.*—8.6 g. of 2-chloro-phenthiazine-10-carboxylic acid 3 - (2 - methyl - 1,3 - dioxo - 2,8 - diazaspiro[4,5]decan-8-yl)-propyl]-ester are heated to 190° for 3 hours at a strongly reduced pressure and in the presence of 0.9 g. of copper powder. 160 cc. of chloroform are then added to the mixture, the copper powder is filtered off and the solution is evaporated to dryness at 15 mm. of Hg. The residue is then treated with 100 cc. of a 10% aqueous tartaric acid solution and 200 cc. of ether. The ether layer is extracted twice more, each time with 100 cc. of a 10% tartaric acid solution, the tartaric acid extracts are combined and made alkaline with solid potassium carbonate. The liberated bases are extracted with chloroform, the extracts are dried over sodium sulphate and evaporated to dryness at 15 mm. of Hg. The residue is dissolved in boiling ethanol and the calculated amount of ethanolic hydrochloric acid is added. 2-chloro-10-[3-(2-methyl-1,3-dioxo - 2,8 - diazaspiro[4,5]decan - 8 - yl) - propyl]-phenthiazine hydrochloride crystallizes upon cooling. Melting point 254–256° (decomposition) after recrystallizing twice from ethanol.

*Hydrogen fumarate.*—Melting point 203–205° (slight decomposition) from ethanol.

The 8 - (3 - hydroxypropyl) - 2 - methyl - 2,8 - diazaspiro[4,5]decan-1,3-dione used as starting material may be produced as follows:

A solution of 154 g. of 1-bromo-propanol-(3) in 350 cc. of benzene is added during the course of one hour to a solution of 404 g. of 2-methyl-2,8-diazaspiro[4,5]decan-1,3-dione in 800 cc. of benzene. The reaction mixture is stirred at room temperature for 9 hours and at 100° for 5 hours and after cooling to room temperature the precipitated 2 - methyl - 2,8 - diazaspiro[4,5]decan - 1,3-dione hydrobromide is filtered off. The filtrate is evaporated to dryness at 15 mm. of Hg and the residue is boiled in 700 cc. of chloroform. After cooling and filtration the filtrate is again evaporated to dryness at 15 mm. of Hg. The residue is distilled in a high vacuum, whereby 8-(3-hydroxypropyl) - 2 - methyl - 2,8 - diazaspiro[4,5]decan-1,3-dione distills over at 192°/0.07 mm. of Hg.

EXAMPLE 14

*2-chloro-10-[3-(2-methyl-1,3-dioxo-2,8-diazaspiro[4,5]decan-8-yl)-propyl]-phenthiazine*

A mixture of 14.5 g. of 2-chloro-phenthiazine and 3.63 g. of sodium amide in 200 cc. of xylene is heated to the boil whilst stirring for 3 hours. The reaction mixture is cooled to 40° and a solution of 16.05 g. of 8-(3-chloropropyl) - 2 - methyl - 2,8 - diazaspiro[4,5]decan - 1,3-dione in 100 cc. of absolute xylene is then added dropwise, heating is effected to 160° for 4 hours and 100 cc. of water are added dropwise to the mixture which has been cooled to room temperature. The xylene layer is decanted, dried over sodium sulphate and evaporated to dryness at 15 mm. of Hg. The residue is taken up in 500 cc. of ether, resinous material is removed by filtration and the ether solution is extracted three times with a total of 300 cc. of a 10% aqueous tartaric acid solution. The acid extracts are made alkaline with solid potassium carbonate and the liberated bases are extracted with chloroform. The chloroform layer is dried over sodium sulphate and the solvent is evaporated at 15 mm. of Hg. Purification of the resulting compound is effected by chromatography on 500 g. of aluminium oxide. To convert the base which has been eluted with benzene/chloroform (3:1) into the acid fumarate the compound is dissolved in boiling ethanol together with the calculated amount of fumaric acid. 2-chloro - 10 - [3 - (2 - methyl - 1,3 - dioxo - 2,8 - diazaspiro[4,5]decan - 8 - yl) - propyl] - phenthiazine hydrogen fumarate crystallizes upon cooling. Melting point 203–205° (slight decomposition) after recrystallizing twice from ethanol.

*Hydrochloride.*—Melting point 254–256° (decomposition) from ethanol.

The 8 - (3-chloropropyl)-2-methyl-2,8-diazaspiro[4,5]-decan-1,3-dione used as starting material is produced as follows:

A solution of 60 cc. of thionyl chloride in 60 cc. of chloroform is added dropwise whilst stirring at room temperature to a solution of 120 g. of 8-(3-hydroxypropyl)-2-methyl-2,8-diazaspiro[4,5]decan-1,3 - dione (production see Example 13) in 700 cc. of chloroform. Stirring is effected for 24 hours at room temperature and heating to the boil is then effected for 2 hours. After cooling the reaction mixture in ice pure 8-(3-chloropropyl)-2-methyl-2,8-diazaspiro[4,5]decan-1,3-dione hydrochloride is filtered off. Melting point 250–251° (decomposition). In order to liberate the base the hydrochloride is suspended in ether, a 30% potassium carbonate solution is added to the suspension and the base is extracted with ether. After drying the ether extract over sodium sulphate the solvent is evaporated at 15 mm. of Hg and the residue is dried in a high vacuum.

EXAMPLE 15

*2-methylthio-10-[3-(2-methyl-1,3-dioxo-2,8-diazaspiro-[4,5]decan-8-yl)-propyl]-phenthiazine*

A mixture of 17.1 g. of 2-methylthio-phenthiazine and 3.3 g. of sodium amide in 200 cc. of absolute xylene is heated to the boil whilst stirring for 75 minutes. The reaction mixture is cooled to 40° and a solution of 18.1 g. of 8-(3-chloropropyl)-2-methyl-2,8-diazaspiro[4,5]decan-1,3-dione in 150 cc. of absolute xylene is then added dropwise, heating is effected to 160° for 2 hours, 3 cc. of methanol are added to the reaction mixture which has been cooled to room temperature and shaking out is effected with water after stirring for 10 minutes. The organic layer is then extracted three times, each time with 100 cc. of a 15% aqueous tartaric acid solution. The combined acid extracts are made alkaline with solid potassium carbonate and the liberated bases are extracted with benzene. The benzene extracts are washed with water, dried over sodium sulphate and evaporated at 15 mm. of Hg. The residue is adsorbed in benzene/petroleum ether (3:1) on 500 g. aluminium oxide. Elution is effected with benzene/petroleum ether (3:1) and this fraction is discarded. The compound eluted with benzene is then converted into the acid fumarate. Pure 2-methylthio-10-[3-(2-methyl-1,3-dioxo-2,8-diazaspiro[4,5]decan-8-yl) - propyl]-phenthiazine hydrogen fumarate melts at 178–180° (decomposition) from ethanol.

EXAMPLE 16

*2-(N,N-dimethylsulphamoyl)-10-[3-(2-methyl-1,3-dioxo-2,8-diazaspiro[4,5]decan-8-yl)propyl]phenothiazine*

A mixture of 5.2 g. of 2-(N,N-dimethylsulphamoyl)-10-(3-chloropropyl)phenothiazine and 5.45 g. of 2-methyl-2,8-diazaspiro[4,5]decan-1,3-dione in 40 cc. of absolute xylene is heated to 170° in a bomb tube for 48 hours. The contents of the tube are filtered off from the resulting precipitate and washed well with benzene. The filtrate is washed with water until neutral, dried over sodium sulphate and then evaporated to dryness at 60° and reduced pressure. The viscous residue is dissolved in 200 cc. of ethyl acetate and the solution is extracted thrice with a total of 200 cc. of a 10% tartaric acid solution. The acid extract are again extracted twice with ether and then a 40% potassium hydroxide solution is added until a strongly alkaline reaction is obtained. Extraction is effected several times with benzene, the benzene extracts are washed with water until neutral, dried over magnesium sulphate and the solvent is distilled off at 60° and reduced pressure.

The crude base is dissolved in acetone and converted into the neutral naphthalene-1,5-disulphonate by the addition of a solution of the calculated amount of naphthalene-1,5-disulphonic acid in ethanol. After recrystallizing the resulting salt twice from a mixture of acetone and ethanol, the pure bis-{2-(N,N-dimethylsulphamoyl)-10-[3 - (2-methyl-1,3-dioxo-2,8-diazaspiro[4,5]decan-8-yl)-propyl]phenothiazine}-naphthalene-1,5-disulphonate, having a melting point of 262–264° (decomposition), is obtained.

The 2-(N,N-dimethylsulphamoyl)-10-(3-chloropropyl) phenothiazine used as starting material is produced as follows:

8.9 g. of 2-(N,N-dimethylsulphamoyl)phenothiazine are added portionwise to a suspension of sodium amide in liquid ammonia, produced from 0.8 g. of sodium and 150 cc. of liquid ammonia. The mixture is stirred for 2 hours and 6.4 g. of 1-chloro-3-bromo-propane are then added dropwise. After evaporating the ammonia, 150 cc. of absolute toluene are added to the contents of the flask and heating to the boil is effected for 2 hours. 70 cc. of a 20% ammonium chloride solution are subsequently added, extraction is effected with benzene, the benzene extracts are washed once with 100 cc. of a 10% ammonium chloride solution and drying is effected over magnesium sulphate. The oily residue obtained after evaporating the solvent is dissolved in benzene/petroleum ether (1:1) and adsorbed on a 20-fold quantity of aluminium oxide. Elution is effected with benzene/petroleum ether (1:1) and after evaporating the eluate 2-(N,N-dimethylsulphamoyl)-10-(3-chloropropyl)phenothiazine is obtained, which is worked up without further purification.

EXAMPLE 17

*2-(N,N-dimethylcarbamoyl)-10-[3-(2-methyl-1,3-dioxo-2,8-diazaspiro[4,5]decan-8-yl)propyl]phenothiazine*

This compound is produced from 6.3 g. of 2-(N,N-dimethylcarbamoyl) - 10 - (3-chloropropyl) phenothiazine and 7.3 g. of 2-methyl-2,8-diazaspiro[4,5]decan-1,3-dione in a manner analogous to that described in Example 1. The neutral naphthalene-1,5-disulphonate has a melting point of 237–240° (slight decomposition) after recrystallizing several times from 95% ethanol.

The 2-(N,N-dimethylcarbamoyl)-10-(3-chloropropyl)-phenothiazine used as starting material is produced from 10 g. of 2-(N,N-dimethylcarbamoyl)-phenothiazine, 8.1 g. of 1-chloro-3-bromopropane and 1.0 g. of sodium in 200 cc. of liquid ammonia, in a manner analogous to that described in Example 1. Purification is effected on a 20-fold quantity of aluminium oxide by elution with benzene.

EXAMPLE 18

*2-methylsulphinyl-10-[3-(2-methyl-1,3-dioxo-2,8-diazaspiro[4,5]decan-8-yl)propyl] phenothiazine*

This compound is produced from 5.95 g. of 2-methylsulphinyl-10-(3-chloropropyl) phenothiazine and 7.05 g. of 2 - methyl - 2,8 - diazaspiro[4,5]decan - 1,3 - dione in a manner analogous to that described in Example 1. The neutral naphthalene-1,4-disulphonate has a melting point of 210–215° (decomposition) after recrystallizing twice from acetone/ethanol.

The 2-methylsulphinyl-10-(3-chloropropyl) phenothiazine used as starting material is produced from 13.05 g. of 2-methylsulphinyl-phenothiazine, 9.45 g. of 1-chloro-3-bromo-propane and 1.7 g. of sodium in 300 cc. of liquid ammonia in a manner analogous to that described in Example 1. Purification is effected on a 20-fold quantity of aluminium oxide by elution with benzene.

EXAMPLE 19

*2-methylsulphonyl-10-[3-(2-methyl-1,3-dioxo-2,8-diazaspiro[4,5]decan-8-yl)propyl] phenothiazine*

This compound is produced from 7.25 g. of 2-methylsulphonyl-10-(3-chloropropyl) phenothiaizne and 8.2 g. of 2 - methyl - 2,8 - diazaspiro[4,5]decan - 1,3 - dione in a manner analogous to that described in Example 1. The neutral naphthalene-1,5-disulphonate has a melting point of 282.5–284° (decomposition) after recrystallizing twice from acetone/ethanol.

EXAMPLE 20

*2-methylsulphonyl-10-[3-(2-methyl-1,3-dioxo-2,8-diazaspiro[4,5]decan-8-yl)propyl] phenothiazine*

A mixture of 17.0 g. of 2-methylsulphonyl-phenothiazine-10-carboxylic acid chloride and 25.4 g. of 8-(3-hydroxypropyl) - 2 - methyl - 2,8 - diazaspiro[4,5]decan-1,3-dione in 400 cc. of absolute toluene is heated to the boil whilst stirring for 24 hours. After filtering the precipitated 8 - (3 - hydroxypropyl) - 2 - methyl - 2,8 - diazaspiro[4,5]decan-1,3-dione hydrochloride the filtrate is evaporated to dryness. The residue is dissolved in 500 cc. of ether and the ether solution is extracted thrice with a total of 300 cc. of a 10% aqueous tartaric acid solution. A layer of 300 cc. of chloroform is placed under the acid extracts and solid potassium carbonate is added whilst cooling with ice until a strong alkaline reaction is obtained. Extraction is effected with chloroform, the extracts are dried over sodium sulphate and evaporated at 15 mm. of Hg. Crude 2-methylsulphonyl-phenothiazine-10 - carboxylic acid - [3 - (2 - methyl - 1,3 - dioxo - 2,8-diazaspiro[4,5]decan-8-yl)propyl] ester is worked up further as such.

The crude product obtained above is heated to 200° at reduced pressure in the presence of 2 g. of copper powder for 4 hours. After cooling, 300 cc. of chloroform are added, the copper powder is filtered off and the solution evaporated to dryness at 15 mm. of Hg. The residue is then dissolved in 400 cc. of ethyl acetate and the solution extracted thrice with a total of 400 cc. of a 10% aqueous tartaric acid solution. The acid extracts are again extracted twice with ether and then a 40% potassium hydroxide solution is added until a strongly alkaline reaction is obtained. Extraction is effected several times with chloroform, the extracts are washed until neutral, dried over magnesium sulphate and the solvent distilled off at 15 mm. of Hg. The crude base is dissolved in acetone and converted into the neutral naphthalene-1,5-disulphonate by the addition of a solution of the calculated amount of naphthalene-1,5-disulphonic acid in ethanol. After recrystallizing the resulting salt twice from a mixture of acetone and ethanol, the pure bis-{2-methylsulphonyl - 10 - [3 - (2 - methyl - 1,3 - dioxo - 2,8 - diazaspiro[4,5]decan - 8 - yl)propyl] phenothiazine}-naphthalene-1,5-disulphonate, having a melting point of 282.5–284° (decomposition), is obtained.

The 8 - (3 - hydroxy - propyl) - 2 - methyl - 2,8 - diazaspiro[4,5]decan-1,3-dione used as starting material may be produced as follows:

A solution of 154 g. of 1-bromo-propanol-(3) in 350 cc. of benzene is added during the course of one hour to a solution of 404 g. of 2-methyl-2,8-diazaspiro[4,5]decan-1,3-dione in 800 cc. of benzene. The reaction mixture is stirred at room temperature for 9 hours and at 100° for 5 hours and after cooling to room temperature the precipitated 2-methyl-2,8-diazaspiro[4,5]decan-1,3-dione hydrobromide is filtered off. The filtrate is evaporated to dryness at 15 mm. of Hg and the residue boiled in 700 cc. of chloroform. After cooling and filtering, the filtrate is again evaporated to dryness at 15 mm. of Hg. The residue is distilled in a high vacuum whereby 8 - (3 - hydroxypropyl) - 2 - methyl - 2,8 - diazaspiro[4,5]decan-1,3-dione distills at 192°/0.07 mm. of Hg.

EXAMPLE 21

*2-methylsulphonyl-10-[3-(2-methyl-1,3-dioxo-2,8-diazaspiro[4,5]decan-8-yl)propyl] phenothiazine*

A mixture of 13.85 g. of 2-methylsulphonylphenothiazine and 2.92 g. of sodium amide in 300 cc. of absolute xylene is heated to the boil whilst stirring for 3 hours. The reaction mixture is cooled to 40° and a solution of 12.9 g. of 8-(3-chloropropyl)-2-methyl-2,8-diazaspiro[4,5]decan-1,3-dione in 100 cc. of absolute xylene is subsequently added dropwise, heating to the boil is effected for 4 hours and 100 cc. of water are added dropwise to the mixture which has been cooled to room temperature. The xylene layer is decanted, dried over sodium sulphate and evaporated to dryness at 15 mm. of Hg. The residue is dissolved in 200 cc. of ethyl acetate and the solution is extracted thrice with a total of 200 cc. of a 10% aqueous tartaric acid solution. The acid extracts are again extracted twice with ether and then a 40% potassium hydroxide solution is added until a strongly alkaline reaction is obtained. Extraction is effected several times with chloroform, the extracts are washed until neutral, dried over magnesium sulphate and the solvent is distilled off at 15 mm. of Hg. The crude base is converted into its naphthalene-1,5-disulphonate in a manner analogous to that described in Example 5; melting point 282.5–284° (decomposition).

The 8 - (3 - chloropropyl) - 2 - methyl - 2,8 - diazaspiro[4,5]decan-1,3-dione used as starting material is produced as follows:

A solution of 60 cc. of thionyl chloride in 60 cc. of chloroform is added dropwise whilst stirring at room temperature to a solution of 120 g. of 8-(3-hydroxypropyl)-2-methyl-2,8-diazaspiro[4,5]decan-1,3-dione (production see Example 5) in 700 cc. of chloroform. Stirring is effected at room temperature for 24 hours and heating to the boil at reflux is subsequently effected for 2 hours. After cooling the reaction mixture to 0°, the pure 8-(3-chloropropyl)-2-methyl - 2,8 - diazaspiro[4,5]decan-1,3-dione hydrochloride is filtered off. Melting point 250–251° (decomposition).

The base is liberated by suspending the hydrochloride in ether, adding a 30% potassium carbonate solution to the suspension and extracting the base with ether. After drying the ether extract over sodium sulphate the solvent is evaporated at 15 mm. of Hg and the residue dried in a high vacuum.

EXAMPLE 22

*A galenic composition: tablets*

|  | Grams |
|---|---|
| Bis - {2 - methylsulphonyl-10-[3-(2-methyl-1, 3 - dioxo - 2,8 - diazaspiro[4,5]-decan-8-yl) propyl] phenothiazine} - naphthalene-1,5-disulphonate (compound of Example 4) | [1] 0.03240 |
| Dimethyl silicone oil | 0.00050 |
| Magnesium stearate | 0.0010 |
| Polyethylene glycol 6000 | 0.0015 |
| Polyvinyl pyrrolidone | 0.0040 |
| Talcum | 0.0050 |
| Maize starch | 0.010 |
| Lactose | 0.1456 |
| For a tablet of | 0.200 |

[1] Corresponds to 0.025 g. of the free base.

What is claimed is:

1. A compound selected from the group consisting of a phenothiazine derivative of formula:

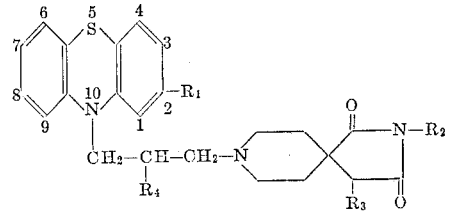

in which $R_1$ signifies hydrogen, halogen, lower alkoxy, lower alkylthio, lower alkanoyl, trifluoromethyl, cyano, N,N-dimethylsulphamoyl, N,N-dimethylcarbamoyl, methylsulphinyl or methylsulphonyl, $R_2$ signifies lower alkyl or aralkyl ($C_7$–$C_{10}$), $R_3$ signifies hydrogen or lower alkyl, and $R_4$ signifies hydrogen or methyl, and a physiologically acceptable acid addition salt thereof.

2. A compound according to claim 1 in which the compound is 2-chloro-10-[3-(2-methyl - 1,3 - dioxo-2,8-diazaspiro[4,5]decan-8-yl)-propyl]-phenothiazine.

3. A compound according to claim 1 in which the compound is 2-methoxy-10-[3-(2-methyl - 1,3 - dioxo-2,8-diazaspiro[4,5]decan-8-yl)-propyl]-phenothiazine.

4. A compound according to claim 1 in which the compound is 2-methylthio-10-[3-(2-methyl - 1,3 - dioxo-2,8-diazaspiro[4,5]decan-8-yl)-propyl]-phenothiazine.

5. A compound according to claim 1 in which the compound is 2-trifluoromethyl-10-[3-(2-methyl - 1,3 - dioxo-2,8-diazaspiro-[4,5]decan-8-yl)-propyl]-phenothiazine.

6. A compound according to claim 1 in which the compound is 2-acetyl-10-[3-(2-methyl-1,3-dioxo - 2,8 - diazaspiro[4,5]decan-8-yl)-propyl]-phenothiazine.

7. A compound according to claim 1 in which the compound is 2 - bromo-10-[3-(2-methyl-1,3-dioxo-2,8-diazaspiro[4,5]decan-8-yl)-propyl]-phenothiazine.

8. A compound according to claim 1 in which the compound is 2-chloro-10-[3-(2-ethyl-1,3-dioxo-2,8-diazaspiro [4,5]decan-8-yl)-propyl]-phenothiazine.

9. A compound according to claim 1 in which the compound is 2 - chloro-10[3-(2-methyl-1,3-dioxo-2,8-diazaspiro[4,5]decan-8-yl)-2-methyl-propyl]-phenothiazine.

10. A compound according to claim 1 in which the compound is 2-chloro-10-[3-(2,4-dimethyl-1,3-dioxo-2,8-diazaspiro[4,5]decan-8-yl)-propyl]-phenothiazine.

11. A compound according to claim 1 in which the compound is 2 - chloro-10-[3-(2-benzyl-1,3-dioxo-2,8-diazaspiro[4,5]decan-8-yl)-propyl]-phenothiazine.

12. A compound according to claim 1 in which the compound is 10-[3-(2-methyl-1,3-dioxo-2,8-diazaspiro [4,5]decan-8-yl)-propyl]-phenothiazine.

13. A compound according to claim 1 in which the compound is 2 - cyano-10-[3-(2-methyl-1,3-dioxo-2,8-diazaspiro[4,5]decan-8-yl)-propyl]phenothiazine.

14. A compound according to claim 1 in which the compound is 2 - (N,N - dimethylsulphamoyl)-10-[3-(2-methyl - 1,3 - dioxo - 2,8 - diazaspiro[4,5]decan-8-yl)-propyl]-phenothiazine.

15. A compound according to claim 1 in which the compound is 2-(N,N-dimethylcarbamoyl)-10-[3-(2-methyl - 1,3 - dioxo - 2,8 - diazaspiro[4,5]decan-8-yl)-propyl]-phenothiazine.

16. A compound according to claim 1 in which the compound is 2 - methylsulphinyl-10-[3-(2-methyl-1,3-dioxo - 2,8 - diazaspiro[4,5]decan-8-yl)-propyl] - phenothiazine.

17. A compound according to claim 1 in which the compound is 2-methylsulphonyl-10-[3-(2-methyl-1,3-dioxo-2,8-diazaspiro[4,5]decan - 8 - yl) - propyl]-phenothiazine.

18. A compound selected from the group consisting of a phenothiazine-10-carboxylic acid ester of formula:

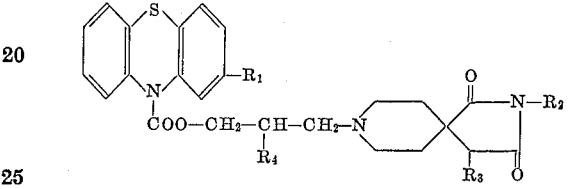

in which $R_1$ to $R_4$ have the significance stated in claim 1.

19. A compound according to claim 18 in which the compound is 2-chloro-phenothiazine-10-carboxylic acid [3-(2-methyl-1,3-dioxo-2,8-diazaspiro[4,5]decan - 8 - yl)-propyl]-ester.

References Cited

UNITED STATES PATENTS 3,320,247   5/1967   Arnold et al. _____ 260—243

WALTER A. MODANCE, *Primary Examiner.*

H. I. MOATZ, *Assistant Examiner.*